April 10, 1951
H. M. ROCKWELL
2,547,976
TIRE MOUNTING AND DEMOUNTING MACHINE OF
THE TYPE HAVING RELATIVE TRAVEL
BETWEEN A TIRE AND A TIRE TOOL
Filed Dec. 8, 1945
3 Sheets-Sheet 3
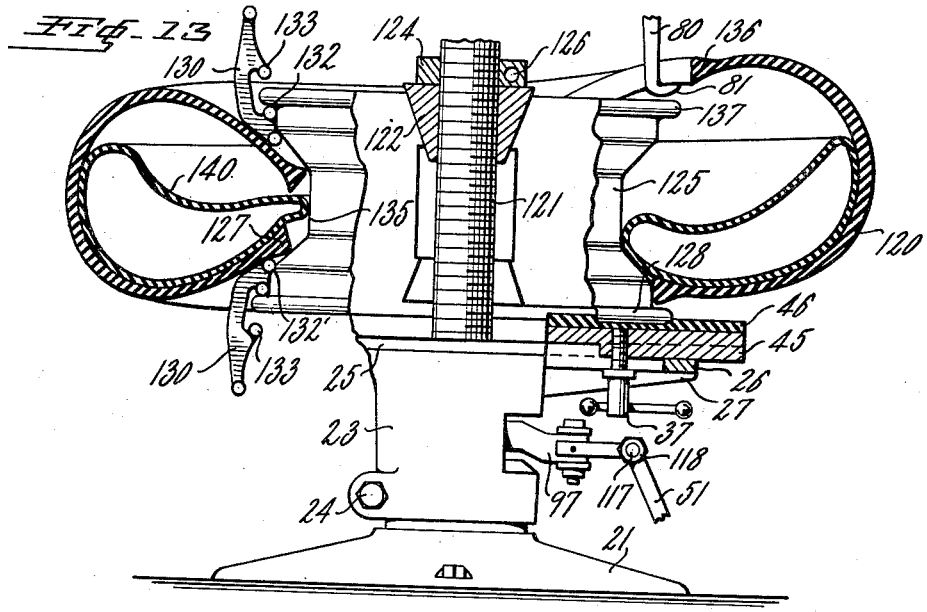
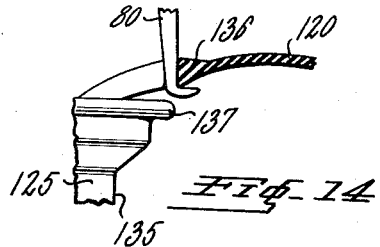
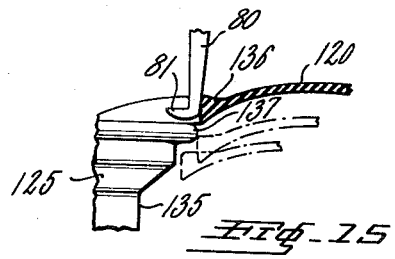
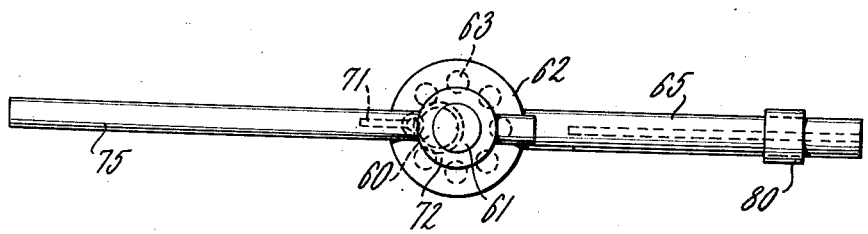
INVENTOR
HUGH M. ROCKWELL
BY
Richard A. Marca
ATTORNEY Patented Apr. 10, 1951

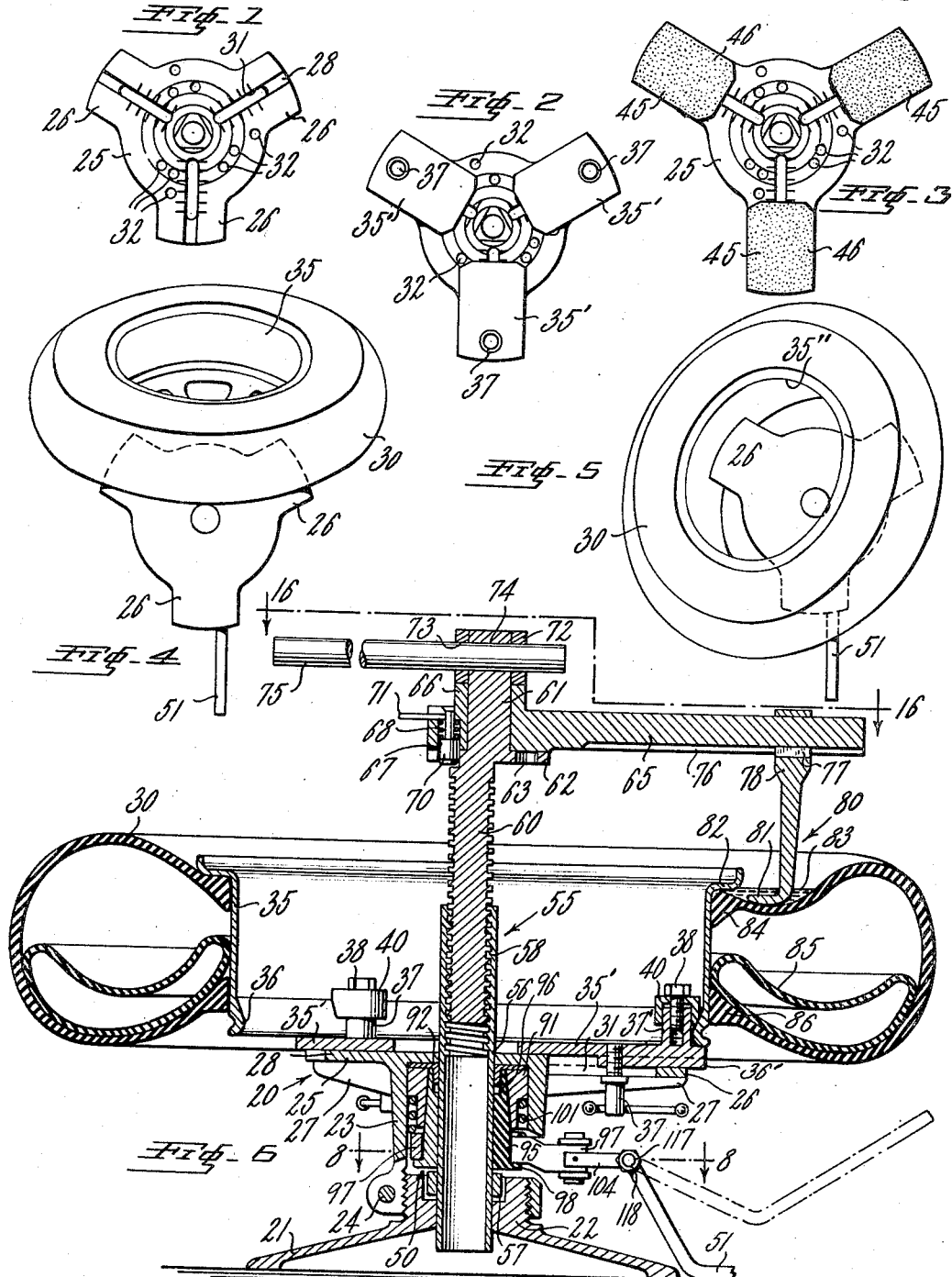
April 10, 1951
H. M. ROCKWELL
2,547,976
TIRE MOUNTING AND DEMOUNTING MACHINE OF THE TYPE HAVING RELATIVE TRAVEL BETWEEN A TIRE AND A TIRE TOOL
Filed Dec. 8, 1945
3 Sheets-Sheet 1
INVENTOR
HUGH M. ROCKWELL
BY
Richard A. Marsen
ATTORNEY

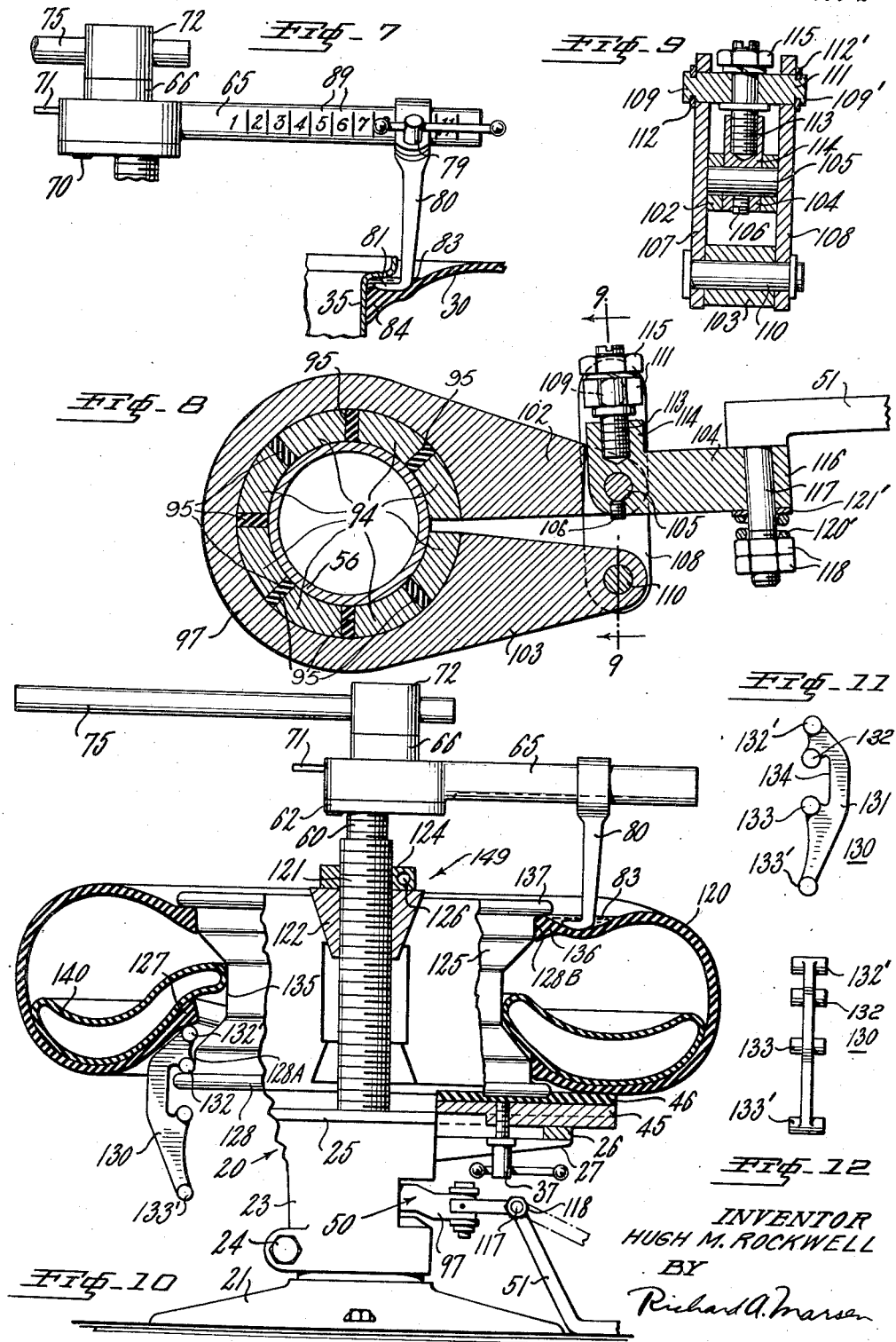

2,547,976

UNITED STATES PATENT OFFICE 2,547,976

TIRE MOUNTING AND DEMOUNTING MACHINE OF THE TYPE HAVING RELATIVE TRAVEL BETWEEN A TIRE AND A TIRE TOOL

Hugh M. Rockwell, Freeport, N. Y.

Application December 8, 1945, Serial No. 633,698

12 Claims. (Cl. 157—1.24)

This invention relates to tire mounting and demounting machines and more particularly to a novel, universally adaptable, easily operated machine for quickly and easily mounting and demounting various types and sizes of tires.

Various types of machines have been proposed for mounting and demounting large size truck, bus and airplane tires. Such machines as hitherto proposed have not been completely satisfactory either because they were not adaptable to various sizes of tires or damaged the tire during the mounting or demounting operations. Additionally, machines hitherto used have been clumsy to operate, and generally have required the services of more than one man both for mounting and demounting the tire on the machine and also for operating on the tire to loosen the same from its rim.

It is among the objects of the present invention to provide a simple, universally adaptable and easily operated machine for quickly mounting and demounting tires without damaging the tires; to provide such a machine with which one man may carry out the mounting and demounting operations; to provide such a machine including novel features assuring quick and accurate alignment of the tire on the machine and having features of ready adjustability and ease of operation; to provide such a machine including interchangeable elements for readily adapting the machine for different types and sizes of tires; to provide such a machine including frictional means for restraining movement of the tire and rim due to torsional stresses exerted on the tire and its rim by tire operating tools; to provide a novel bead supporting block for use with tire mounting and demounting means; and, in general, to provide a simple tire machine effective to demount tires from their rims irrespective of the type and size of tire or of the difficulty in loosening the same from its rim.

These and other objects, advantages and novel features of the invention will be apparent from the following description and the accompanying drawings. In the drawings:

Fig. 1 is a plan view of the tire support member of a tire mounting and demounting machine base forming part of the present invention.

Fig. 2 is a plan view of the tire support member as adapted for operations on a truck tire.

Fig. 3 is a view similar to Fig. 2, showing the support member arranged for operations on a drop-center rim type of tire.

Figs. 4 and 5 are partially diagrammatic plan views illustrating how two different types of tires are placed on the support member.

Fig. 6 is a central sectional view through the machine illustrating the machine as used to loosen the bead of and demount a truck tire.

Fig. 7 is an elevation view, partly in section, of a portion of the machine shown in Fig. 6, illustrating a further step in the operation of loosening a bead of and demounting a truck tire.

Fig. 8 is a sectional view on the line 8—8 of Fig. 6.

Fig. 9 is a sectional view on the line 9—9 of Fig. 8.

Fig. 10 is a central sectional view, partly broken away, illustrating the machine as adapted for loosening a bead of and demounting a tire from a drop-center rim.

Figs. 11 and 12 are elevation and plan views, respectively, of a bead supporting block used with the machine of the present invention.

Fig. 13 is a view similar to Fig. 10 illustrating a step in the operation of taking a tire bead off over the wheel flange and demounting a tire from a drop-center rim.

Fig. 14 is an elevation view, partly in section, of a portion of the machine of Fig. 10 during a stage of taking a tire bead over a wheel flange from a drop-center rim.

Fig. 15 is a view similar to Fig. 14 illustrating elements of the machine as arranged for forcing a tire bead over a wheel flange mounting a tire on its rim.

Fig. 16 is a plan view, along the line 16—16 of Fig. 6, illustrating an eccentric device forming part of the tire machine.

Generally speaking, the tire machine of the present invention includes a support member such as a platform or base, for supporting the tire and a central arbor acting as a pivot for tire engaging tools. The base is preferably affixed to a floor, or other fixed support, and is relatively low in height so that tires and wheel rims may be easily placed thereon and removed therefrom. Preferably, the height of the base is substantially less than the radius of the tire so that the tire may be easily moved into position by one man.

The arbor is detachably engageable with the base, and one of the features of the present invention is the provision of a quick-acting clamp for clamping the lower end of the arbor to restrain the arbor against axial thrust and rotational torque during operations on a tire. Such quick-acting clamp is operable by a lever or treadle extending outwardly beyond the rim of a tire located on the machine. Thereby the arbor may be quickly clamped and released without any necessity for the operator getting underneath the tire on the machine to engage and disengage the clamp.

The base adjustably receives different types of supporting plates for cooperation with different types of tires in differing sizes. The supporting plates are detachably clamped in adjusted position on the base and may be easily removed or replaced to accommodate different types and sizes of tires. For operations on a tire held in place on a demountable cylindrical rim by a clamping ring, clamps are used for holding automotive wheels and the supporting plates or pads are provided with clamps or friction pads for engaging the edge of the airplane wheel or rim to secure the same against rotation relative to the base, as illustrated in Fig. 6.

When the machine is used for operations on a drop-center rim type of tire, supporting plates are provided having frictional material on their tire or rim engaging surfaces. A cone is provided for the arbor, which engages the central recess of a rim to center the tire properly on the machine and, in combination with the above mentioned quick-acting clamp, to firmly grip the tire and rim against torsional and axial thrust stresses tending to rotate the tire and rim on the machine.

The invention further includes novel tools employing adequate force for operating on the tire both to demount the same from the rim or wheel and to remount the same on the rim or wheel. A novel eccentric arrangement is provided for quickly adjusting the tools relative to the tire bead so that it may be moved rapidly into a position beneath the edge of the rim and in direct engagement with the bead so that pressure is exerted directly on the bead rather than at a point on the tire spaced radially outwardly from the bead. Thereby, damage to the tire due to pressure thereon at a point outwardly of the bead is prevented.

Referring more particularly to Figs. 1 through 6 of the drawing, the tire machine 20 includes a generally circular base 21 having a threaded boss 22 to which is secured the lower end of a column 23 preferably integral with a tire supporting platform 25. The lower end of column 23 is in the form of a split clamping nut which may be tightened to lock the column to boss 22 by a suitable bolt and nut arrangement 24. Platform 25 is provided with radially extending support arms 26, preferably three in number, which are reinforced by tapered ribs 27. The upper surfaces of arms 26 are each formed with a radially extending groove 28, the inner portion of which is cut away to form a slot 31. A plurality of apertures generally indicated at 32, and preferably threaded, are formed on the upper surface of platform 25 for a purpose described hereinafter.

Fig. 2 illustrates the machine 20 as arranged to receive a truck tire 30 of the type held onto a cylindrical rim 35 by a split ring fitting in the bead 36 of the rim. For this purpose, one or more support pads or plates 35' are mounted on the arms 26. Plates 35' each have a rib 36' on their under surfaces slidably receivable in channel 28 and slot 31 of arms 26. A threaded aperture is provided in each plate 35' to receive suitable clamping means, such as a bolt 37, by means of which plates 35' are held in adjusted position with respect to arms 26 to accommodate different sizes of tires. On the upper surface of each plate 35' there is a threaded boss 37' which receives a stud 38 for clamping a wedge 40 against portion 36 of rim or wheel 35 to hold the same locked in position on platform 25.

If rim 35 is of the disk or solid type provided with bolt holes, the rim may be secured to platform 25 by suitable fastening means threaded into apertures 32. It will be noted that apertures 32 are arranged at varying radial distances from the center of platform 25 with differing circumferential spacing to accommodate wheels of different types.

When the machine is to be used for operations on a tire mounted on a drop-center rim, as described more fully hereinafter, plates 35' are removed from platform 25 and one or more wheel supporting plates 45 are secured in place on arms 26. The upper surface of each plate 45 is provided with a suitable resilient and friction material 46, such as, for example, rubber. The operation of the machine with the support pads 46 of Fig. 3 will be described in connection with Figs. 10 through 13.

Preferably, platform 25 of machine 20 is disposed at a height above the floor less than the radius of the tires to be mounted thereon. Therefore, and as indicated somewhat diagrammatically in Figs. 4 and 5, tire 30 mounted on its rim 35 may be rolled toward machine 20 and tipped over on to the support pads mounted thereupon. Thus, the tire may be easily mounted on the machine by one man as no lifting is required. If tire 30 is mounted on a rim 35" of the plain cylindrical type, it is mounted over machine 20 as diagrammatically illustrated in Fig. 5.

Referring more particularly to Fig. 6, column 23 is hollow and receives a split clamp arrangement, generally indicated at 50, whereby an arbor, generally indicated at 55, may be secured centrally within the column. Clamp 50 is operated by a bent lever 51 which, as described more fully hereinafter, may either lie on the floor in the solid line position or may be frictionally held in the elevated dotted line position shown in Fig. 6. Clamp 50 will be described more fully in connection with Figs. 8 and 9.

Arbor 55 is removable quickly and easily from machine 20 during the mounting and demounting of a tire with respect to a machine. The arbor forms an axle for the operation of tire removing tools as will be made apparent hereinafter. For this purpose, arbor 55 includes a sleeve 56 receivable in split clamp 50. A split drag ring 57 is mounted in a recess in the upper portion of boss 22 for frictionally gripping sleeve 56. Ring 57, due to its frictional engagement with arbor 55, maintains the arbor in any adjusted vertical position.

The upper end of sleeve 56 is threaded as at 58 to receive a threaded shaft 60 having an eccentric portion or offset boss 61 on its upper end. Adjacent the intersection of eccentric portion 61 with the main portion of shaft or axle 60, a flange 62 is formed concentrically with eccentric portion 61 and this collar is provided with a plurality of apertures 63 as shown more clearly in Fig. 16.

A tool support arm 65 is provided with a cylindrical boss 66 rotatably mounted on eccentric boss 61. In the inner end of arm 65 is a recess 67 aligned with an aperture 63. A plunger 70 is mounted in recess 67 and urged downwardly by a compression spring 68. A handle 71 projects from plunger 70 in diametric alignment with arm 65 whereby the plunger 70 may be lifted from engagement with any one of the apertures 63 to adjust the position of arm 65 on eccentric boss 61. The purpose of this arrangement will be apparent as the description proceeds.

A collar 72 fits over off-set boss 61 above boss 66 on arm 65, and is provided with a pair of apertures 73 which are alignable with an aperture 74 in off-set boss 61 to receive an operating rod 75. When operating rod 75 is engaged in aperture 74, turning movement may be exerted on axle 60 to rotate tool arm 65. By adjusting the position of tool arm 65 on off-set boss 61, by suitable engagement of plunger 70 in one of the apertures 63, the effective radial length of arm 65 may be quickly and easily adjusted.

Tool arm 65 is provided on its lower edge with a longitudinally extending keyway 76 receiving a key 77 in a boss 78 forming part of a tire operating tool 80. Tool 80 has any desired configuration but preferably comprises a radially directed shoe or operator 81 which is suitably rounded and tapered for engagement with tire 30. Tool 80 is clamped in any adjusted position on arm 65 by a suitable clamp 79 (Fig. 7). In order to provide ready adjustment for various sizes of tires, indicia 89 are preferably marked on the outer surface of arm 65.

The operation of machine 20 in demounting a truck tire 30 from a rim 35 will now be described with particular reference to Figs. 1 through 7. As a first step, the snap ring (not shown) is removed from rim groove 36 and tube 85 of the tire is deflated in the usual manner. Meanwhile, plates 35' will have been secured in adjusted position on arm 26 and platform 25 by means of bolt devices 37. Tire 30 is then rolled over to the machine 20, as indicated in Fig. 4, and is placed on plates 35'. The tire is then centered on the plates 35' and wedges 40 are clamped by studs 38 against bead portion 36 of rim 35. Arbor 55 is then engaged in the machine.

Previously, axle 60 will have been roughly adjusted with respect to sleeve 56 so that tool 80 will engage the exterior surface of tire 30. During insertion of arbor 55, clamp 50 is released through swinging movement of treadle 51, in a manner to be described. Ring 57 frictionally engages arbor 55 as the latter is inserted in clamp 50 and holds it in adjusted position during adjustment of tool 80. When the arbor is adjusted in approximate position to engage tool 80 with tire 30, clamp 50 is operated to clamp arbor 55 against axial thrust and sleeve 56 thereof against rotation. By operation of plunger 70, tool arm 65 is swung around off-set boss 61 until it is in its most extended position. This position may be determined by alignment between operating rod 75, and arm 65. A suitable lubricant 83, such as soapy water, is placed on the upper surface of tire 30.

Tool 80 is then adjusted longitudinally of arm 65 until the inner end of the tool is adjacent flange 82 of rim 35. Arbor 55 is then dropped until tool 80 engages tire 30. Arm 75 is then turned, revolving axle 60. The latter screws downwardly into tubular member 56 when the plunger 70 is in locked position, forcing tool 80 downwardly and pushing the side wall of tire 30 downwardly as indicated in Fig. 6 by the leverage exerted by the arm 75. As the foot or shoe 81 of tool 80 moves to a position lower than flange 82, arm 65 is adjusted on off-set boss 61 at intervals, when the plunger 70 is in unlocked position, to move tool 80 inwardly toward rim 35. Ultimately, tool 80 will have been moved inwardly to the position shown in Fig. 7 where it directly engages bead 84 of tire 30. Rotary swinging movement of rod 75 is continued, forcing bead 84 downwardly, by the screw action of parts 56 and 60, until it engages bead 86. Both beads are then moved downwardly until tire 30 is entirely disengaged from rim 35, dropping to the floor.

The action of tool 80 in loosening the tire bead resembles that of a kneading machine. The tool has a curved end surface which slides along the tire being lubricated by lubricant 83. As the tool progresses over the tire, progressive portions of the tire body are compressed and reexpanded. This action effects a rapid loosening of the bead from the rim. This is particularly important in removing large truck and bus tires from their rims. Such tires, being bulky, are difficult to handle, as, during service, they have become frozen to the rim. Such freezing has frequently been of such an extent that heretofore the tire has been cut to pieces to remove it from the rim, which is very costly, as the tire is a relatively expensive piece of equipment.

Figs. 6, 8 and 9 illustrate the construction of the split clamp 50. This clamp includes a shouldered collar 91 mounted in column 23. A flanged washer 92 is mounted between the upper end of collar 91 and the lower surface of platform 25. The inner surface of collar 91 is tapered to form a conical bearing surface. Disposed within collar 91 is a split clamp member 93 comprising fingers 94 separated by strips of cushioning and sealing material 95. A flange of washer 92 fits into a recess 96 extending circumferentially of split clamp member 93 and prevents any of the soap lubricant 83 from the tire from getting between the outer surface of clamp member 93 and the inner surface of collar 91, which surfaces are complementarily tapered. A split clamp 97 surrounds clamp member 93 and rests on a flange 98 on the lower edge of clamp member 93. A spring 101 urges clamp 97 and thus clamp member 93 downwardly. As pressure is exerted by tool 80 against tire 30 arbor 55 tends to move upwardly. This pulls tapered clamp member 93 upwardly into tapered collar 91, increasing the frictional engagement between these members in direct ratio to the amount of downward force exerted by tool 80.

A toggle joint operated by treadle 51 is provided for quickly opening and closing clamp 97. For this purpose, clamp 97 has a pair of outwardly extending ears 102, 103. A bell crank member 104 has its elbow pivotally mounted on a shaft 105 mounted in the forked outer end of ear 102 and is secured to the shaft by a set screw 106. A pair of links 107, 108 have their forward ends secured to a shaft 110 extending through the outer end of ear 103. The rearward ends of links 107, 108 are interconnected by a bar 111 held in place by split rings 112, 112' engaged in trunnion portions 109, 109'. A stud 113 extends through bar 111 into arm 114 of crank 104, and is locked in position by a lock nut 115. The outer arm 116 of crank 104 receives a pin 117 projecting laterally from treadle 51. On the outer end of pin 117 are secured a pair of nuts 118 which engage a spring 120' engaging a washer or spring seat 121' disposed against crank 104. Spring 120' forms a friction device for maintaining treadle 51 in any adjusted position, so that the treadle may be either held above the floor for hand operation or laid on the floor for foot operation. For instance, if treadle 51 is in an elevated position when a tire is placed on machine 20, the tire can force the treadle downwardly without damage.

With the described arrangement, as arm 51 is swung in a clockwise direction as viewed in Fig. 8, a toggle action is effected drawing ears 102, 103 toward each other. This moves fingers 94 toward each other, compressing cushioning material 95 and gripping arbor 56. As the arbor is drawn upwardly, clamp member 93 is firmly engaged in collar 91 due to the inter-action of the conical surfaces.

Figs. 10 through 15 illustrate machine 20 as arranged to mount and demount tire 120 from a drop-center rim or wheel 125. For this purpose, support pads or plates 35' are removed and support plates 45 secured in adjusted position on arms 26 and platform 25 by bolt devices 37. The tire and its wheel or rim are then placed on top of pads 46 where the rubber or other frictional surface 46 frictionally engages the tire and rim to restrain the same against rotation when the tire and rim are clamped against the rubber and the frictional load is taken on the rim.

A different type of arbor 149 is used in this instance, including a bearing sleeve 121 which is threaded both internally and externally. In operation, arbor 149 is initially removed from the remainder of machine 20 and tire 120 and rim 125 are placed on pads 46. A cone 122 is slidably mounted on sleeve 121 and a nut 124 is threadedly engaged with sleeve 121 above cone 122.

Cone 122 is moved along sleeve 121 through rotation of nut 124 to a position in which it holds the wheel frictionally engaged with the material 46 so that, when arbor 149 is engaged in split clamp 50, tool 80 will engage the outer surface or side wall of tire 120. The arbor is thus, by the rotation of the drive bar 75, engaged in clamp 50 and the bead 136 is forced down by the screwthread 60 until the upper side of the lower end of the tool 80 is beyond the plane of the inside of the rim flange 137, whereupon the lower end of the tool 80 is forced radially between the rim flange 137 and the tire bead 136 by disengagement of the plunger from its opening 63 and rotating the eccentric offset boss 61 in the hub 65. The operating bar 75 is then rotated farther after resetting the plunger 70, until the bead 136 is stripped from the flange and moved into the center recess of rim 125. The operation of removing the tire then proceeds by first stripping the bead 136 from the bead seat, as shown in Figs. 7 and 10 and then removing the bead 127 as explained hereinafter and as shown in Fig. 14.

Fig. 10 illustrates the tire at an intermediate stage of the operation, in which bead 127 has previously been loosened from rim flange 128 and surface 128A and the tire and rim have been placed in the reversed position on machine 20. Such loosening operation is accomplished by tool 80 being operated by the rod 75 in the same manner as previously described, with arm 65 being adjusted on offset boss 61 to pull tool 80 radially inwardly to engage bead 127.

In this embodiment of the invention a bead supporting block 130 is used, the lower portion of which can serve as a handle. Block 130 comprises an elongated flat portion 131 having a pair of spaced cylindrical bosses 132, 132' formed adjacent one end and a second pair of spaced bosses 133, 133' formed adjacent the other end of the block. The center portion of the block is recessed as at 134. When bead 127 has been loosened from flange 128 and surface 128A, block 130 is inserted so that bosses 132, 132' engage bead 127 and rim flange 128 to maintain bead 127 toward the drop-center portion 135 of rim 125. It will be noted that bosses 132, 132' are spaced more closely than are bosses 133, 133'. Block 130 may thus be used with rims of different axial lengths. When first inserted, block 130 has the position shown in Fig. 10.

After insertion of block 130, the tire is located in the reversed position shown in Fig. 10, and tool 80 is operated to loosen bead 136 from flange 137 and surface 128B of rim 125 and move bead 136 toward drop-center portion 135. Such operation takes place as previously described through rotation of operating rod 75 which causes axle 60 to thread into sleeve 121 drawing tool 80 downwardly. When the wall is forced downwardly, so that the tool is slightly below the flange, the tool is moved inwardly under the flange. As the tool is drawn downwardly, it is progressively moved radially inwardly, by adjustment of arm 65 on off-set boss 61 to draw tool 80 between bead 136 and flange 137. After bead 136 has been moved downwardly sufficiently to move into drop-center portion 135, a second block 130 is inserted between bead 136 and flange 137. A tire iron is then inserted beneath bead 136 to force the bead above flange 137. This forces the opposite side of the tire down into rim portion 135. During such movement, blocks 130 rock about inner bosses 132', riding the tire beads into the center wheel substantially without friction. Tool 80 is then brought upwardly to a height equal to that shown in Fig. 13. Clamp 79 is then loosened, and tool 80 is removed from arm 65 and reversed to the position shown in Fig. 13, where the shoe 81 of the tool is brought out beneath bead 136 by operation of the eccentric. Rod 75 is then rotated in the reverse direction to pull tool 80 and bead 136 up from flange 137 as shown in Fig. 14. Further swinging movement of rod 75 thereupon rides tool 80 around bead 136 and the entire bead is pulled above flange 137 thus permitting deflated tube 140 to be removed from tire 120 in the usual manner for inspection and repair. As the bead 136 is pulled upwardly and outwardly, blocks 130 may drop away from the tire and rim.

I will now describe the operation of replacing the bead 136 over the flange 137. One side of the bead is first placed in the wheel well. The tool 80 is brought into operation with its shoe point pointing inwardly and the shoe heel extened outwardly slightly farther than the outer periphery of the wheel rim as shown in Fig. 15 and at a point near where the bead passes over the periphery of the rim. Now, with the eccentric offset boss 61 locked with relation to the arbor 60, by the plunger 70, the operating rod 75 is used to turn the tool relative to and against the inner surface of the bead 36. The direction of movement is such that as the tool moves to put the bead over the edge of the rim, the arbor 60 is moved upwardly to move the tool away from the rim. The movement of the tool circumferentially moves the bead over the edge of the wheel rim flange at the same time, the slight upward movement keeps the tool clear from binding on the rim.

The described invention comprises an easily operated, universally adapted tire machine effective for quickly and easily demounting tires either from a plain cylindrical rim or a drop-center rim. The frictional pads 46 in cooperation with the cone 122 and nut 124 provide an effective means for restraining rotation of the wheel rim during operation of the machine, and eliminate the devices heretofore thought necessary for clamping the wheel to the machine. Such devices as heretofore used, in order to be made universally adaptable of necessity allowed movement of the wheel interfering with effective operation of the machine. Furthermore, the machine is of such height that one man can easily mount and dismount the tire and its rim or wheel thereon. The split clamp device 50, operable by outwardly extending treadle 51, affords a ready means for quickly engaging and disengaging the arbors of the machine, without necessitating getting under the tire and loosening a clamp arrangement. Furthermore, drag ring 57 effectively holds the arbors in their vertically adjusted position.

The split clamp 50 provides for quick release of the arbor from the tire support and quick securement of the arbor in position. Thus, the arbor can be quickly removed to permit a wheel being easily tipped over onto the support, and then be quickly re-secured to the support. This is of great importance in placing large diameter, heavy wheels and tires on the support.

The off-set or eccentric arrangement of the tool support on the arbor provides a large mechanical advantage in forcing the tool between the tire bead and the rim flange. The mechanical ratio between operating bar 75 and the radius of eccentricity permits much greater force to be exerted than would be possible in other arrangements for pulling the tire tool transversely of the tire.

In describing the supporting means for the wheel when in held position, the term platform has been used. This term is used functionally and is not intended to mean that the platform must necessarily be in or even near a horizontal plane or that it must be in three pieces as shown, since it may have any number of pieces.

Also in describing the operation of the invention, the term wheel is used. This term is used in a general way to include wheels and demountable rims of various types which are designed to carry demountable tires.

While specific embodiments of the invention have been shown and described in detail to illustrate the application of the principles thereof, it will be understood that the invention may be otherwise embodied without departing from such principles.

What is claimed is:

1. A tire mounting and demounting machine comprising, in combination, a base, a platform mounted on said base and arranged to support a wheel adapted to carry a tire, said machine having a central passage therein, an arbor disengageably mounted in such passage, frictional clamping means mounted on the machine engaging said arbor and effective to frictionally resist axial thrust thereon and to restrain rotation of said wheel and including wedge means restraining outward movement of said arbor, a conical member on said arbor, means effective to engage said wedge member with the wheel for cooperation with said wedge means in clamping the wheel against said platform, and a tire mounting and demounting device operatively associated with said arbor.

2. A tire mounting and demounting machine comprising, in combination, a base, a platform mounted on said base and arranged to support a wheel adapted to carry a tire, said base and platform having aligned central substantially cylindrical passages therein, an arbor having a cylindrical portion disengageably mounted in such passages, frictional clamping means mounted in one of such passages engaging said arbor portion and effective to frictionally resist axial thrust thereon and to restrain rotation of said portion and including conical means restraining outward movement of said arbor, an operator for said clamping means extending radially beyond a wheel mounted on said platform, for easy access, a wedge member on said arbor; means effective to engage said wedge member with the wheel for cooperation with said wedge means in clamping the wheel against said platform, and a tire mounting and demounting device operatively associated with said arbor.

3. A tire mounting and demounting machine comprising, in combination, a base, a platform mounted on said base and arranged to support a wheel adapted to carry a tire, said base and platform having aligned central substantially cylindrical passages therein, means operative to clamp the wheel to prevent rotation thereof and resist axial thrust thereon, an arbor comprising an internally and externally threaded member, detachably engageable in such passages, and a threaded shaft cooperable with said member and having an eccentric cylindrical boss formed on its outer end, frictional clamping means mounted in one of such passages engaging said arbor member and effective to frictionally resist axial thrust thereon and to restrain rotation of said member and including wedge means restraining outward movement of said arbor, an operator for said clamping means extending radially beyond a wheel mounted on said platform, for easy access, a radially extending tool supporting arm rotatably mounted on said eccentric boss, a tire engaging tool adjustably clampable on said arm, means for rotating said shaft to move said tool parallel to the axis of said tire, and releasable means engageable in any of a plurality of circumferentially spaced positions around said eccentric boss constraining said arm against rotation on said boss, and whereby said arm may be adjusted radially relative to said shaft to adjust the position of said tool radially relative to the tire.

4. A tire mounting and demounting machine comprising, in combination, a base, a platform mounted on said base and having arms, tire supporting pads adjustably mounted on said arms and arranged to support a wheel adapted to carry a tire, said base and platform having aligned central substantially cylindrical passages therein, clamping means arranged to grip a wheel to prevent rotation of the wheel and resist axial thrust thereon, an arbor comprising an internally and externally threaded member, detachably engageable in such passages, and a threaded shaft cooperable with said member and having an eccentric cylindrical boss formed on its outer end, frictional clamping means mounted in one of such passages engaging said arbor member and effective to frictionally resist axial thrust thereon and to restrain rotation of said member and including wedge means restraining outward movement of said arbor, an operator for said clamping means extending radially beyond a rim mounted on said platform, for easy access, a radially extending tool supporting arm rotatably mounted on said boss, a tire engaging tool adjustably clampable on said arm, means for rotating said shaft to move said tool parallel to the axis of said tire, and releasable means engageable in any of a plurality of circumferentially spaced positions around said eccentric boss constraining said arm against rotation on said boss, and whereby said arm may be adjusted radially relative to said shaft to adjust the position of said tool radially relative to the tire.

5. A tire machine, for mounting and demounting a tire with respect to a drop-center rim, comprising, in combination, a base, a platform mounted on said base and having arms, tire supporting pads adjustably mounted on said arms and having friction material surfaces, said base and platform having aligned central substantially cylindrical passages therein, an arbor comprising an internally and externally threaded member, detachably engageable in such passages, and a threaded shaft cooperable with said member and having an eccentric cylindrical boss formed on its outer end, frictional clamping means mounted in one of such passages engaging said arbor member and effective to frictionally resist axial thrust thereon and to restrain rotation of said member, and including wedge means restraining outward movement of said arbor, an operator for said clamping means extending radially beyond a rim mounted on said platform, for easy access, a cone slidably mounted on said arbor member, a nut threadedly mounted on said arbor member to engage said cone with the tire rim for cooperation with said wedge means in clamping the rim against said friction material, a radially extending tool supporting arm rotatably mounted on said boss, a tire engaging tool adjustably clampable on said arm, means for rotating said shaft to move said tool parallel to the axis of said tire, and releasable means engageable in any of a plurality of circumferentially spaced positions around said eccentric boss constraining said arm against rotation on said eccentric boss, and whereby said arm may be adjusted radially relative to said shaft to adjust the position of said tool radially relative to the tire.

6. In a tire mounting and demounting machine of the type in which relative revolution is effected between a wheel adapted to carry a tire and a tire operating tool, wheel and rim supporting means, an arbor mounted in said supporting means and extending axially of a wheel thereon, a tire tool support arm extending radially of the wheel and rotatable on said arbor, a drive bar for rotating said arm; and cooperating means on said arbor and said arm effective, upon rotation of said drive bar, to move said arm radially to force a tool thereon between a tire bead and a rim flange.

7. A tire manipulating machine for removing tires from or mounting tires on wheels of various types and sizes comprising, in combination, a platform having an extent at least large enough to give contact and support to the outer periphery of a tire-carrying wheel, said platform having rim-contacting portions in a plane for any one of various types and sizes of wheels, means for pressure-friction holding a tire-carrying wheel on the platform including a clamping means in the central opening of the wheel exerting force on the wheel to press the same toward the platform, and yielding frictional means for resisting relative turning between the wheel and platform and a tire manipulating tool mounted in spaced relation to the platform and held in position for relative revolution with relation to the wheel position center and in position to engage the tire adjacent the rim.

8. A tire manipulating machine for removing tires from or mounting tires on wheels of various types and sizes comprising in combination a sectional platform having an extent at least large enough to give contact and support to the outer periphery of a tire-carrying wheel, said platform having rim-contacting portions in a plane for any one of various types and sizes of wheels, means for pressure-friction holding a tire-carrying wheel on the platform including a clamping means in the central opening of the wheel exerting force on the wheel to press the same toward the platform and yielding frictional means for resisting relative turning between the wheel and platform and a tire manipulating tool mounted in spaced relation to the platform and held in position for relative revolution with relation to the wheel position center and in position to engage the tire adjacent the rim, the portions being adjustable radially with relation to the wheel axis.

9. A machine for stripping tire beads from their bead seats, said machine comprising a platform, means for holding a tire-carrying wheel on the platform, a tool holder and mechanism for positively and progressively moving the tool holder with its tool around the wheel in contact with and against the tire adjacent the rim and for simultaneously positively moving the holder axially with respect to the wheel, thus producing a helical movement, and a positively operating retracting and distending means for, at will, moving the tool inwardly or outwardly to force the tool in adjacent the inner surface of the rim flange between the flange and the tire bead or to withdraw it therefrom.

10. A machine for stripping tire beads from their bead seats, said machine including a platform, means for holding a tire-carrying wheel on the platform, a tool holder and mechanism for positively and progressively moving the tool holder with its tool around the wheel in contact with and against the tire adjacent the rim and for simultaneously positively moving the holder axially with relation to the wheel, thus producing a helical movement, and a positively operating retracting and distending means, including an eccentric in the train of connections between the moving mechanism and the tool holder for, at will, moving the tool inwardly or outwardly, to force the tool in adjacent the inner surface of the rim flange between the flange and the tire bead or to withdraw it therefrom.

11. A machine for stripping tire beads from their bead seats, said machine comprising a platform, means for holding a tire-carrying wheel on the platform, a tool holder and mechanism for positively and progressively moving the tool holder with its tool around the wheel in contact with and against the tire adjacent the rim and for simultaneously positively moving the holder axially with respect to the wheel, thus producing a helical movement, and a positively operating retracting and distending means for, at will, moving the tool inwardly or outwardly, to force the tool in adjacent the inner surface of the rim flange between the flange and the tire bead, or to withdraw it therefrom, and a single manually operated means for providing power for the circumferential and axially moving means and the positively operating retracting means.

12. A machine for stripping tire beads from their bead seats, said machine comprising a platform, means for holding a tire-carrying wheel on the platform, a tool holder and mechanism for positively and progressively moving the tool holder with its tool around the wheel in contact with and against the tire adjacent the rim and for simultaneously positively moving the holder axially with respect to the wheel, thus producing a helical movement, and a positively operating retracting and distending means for, at will, moving the tool inwardly or outwardly, to force the tool in adjacent the inner surface of the rim flange between the flange and the tire bead, or to withdraw it therefrom, and a locking means for holding the tool at a substantially fixed distance from the wheel center.

HUGH M. ROCKWELL.

REFERENCES CITED

The following references are of record in the file of this patent:

UNITED STATES PATENTS

| Number | Name | Date |
|---|---|---|
| 752,881 | Ball | Feb. 23, 1904 |
| 965,076 | Carle | July 19, 1910 |
| 999,775 | Gallagher | Aug. 8, 1911 |
| 1,341,727 | Weaver | June 1, 1920 |
| 1,402,471 | Beck | Jan. 3, 1922 |
| 1,451,344 | Robinett | Apr. 10, 1923 |
| 1,607,341 | Crost | Nov. 16, 1926 |
| 1,667,351 | Levitt | Apr. 24, 1928 |
| 1,720,614 | Welch | July 9, 1929 |
| 1,742,590 | Freivogel | Jan. 7, 1930 |
| 1,793,864 | Manley | Feb. 24, 1931 |
| 1,948,434 | Stafford et al. | Feb. 20, 1934 |
| 2,034,819 | Maulis | Mar. 24, 1936 |
| 2,090,838 | Gustafson | Aug. 24, 1937 |
| 2,112,661 | Abrahams | Mar. 29, 1938 |
| 2,340,316 | Fest | Feb. 1, 1944 |

FOREIGN PATENTS

| Number | Country | Date |
|---|---|---|
| 765,192 | France | Mar. 19, 1934 |